United States Patent Office 3,438,206
Patented Apr. 15, 1969

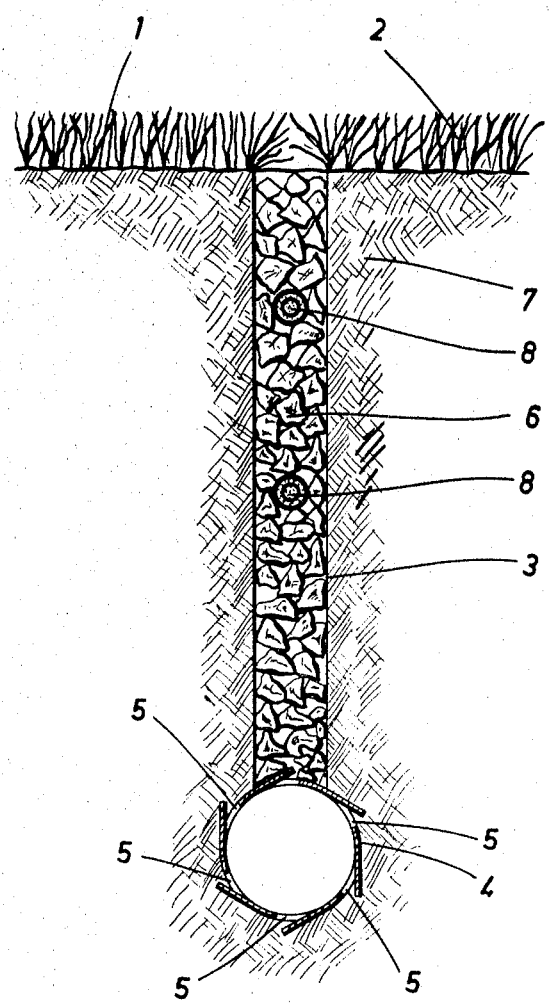

3,438,206
WALK-ON LAWN
Erwin Stärk, Fischerfeldstrasse 28,
Linz-Ebelsberg, Austria
Filed Mar. 8, 1967, Ser. No. 621,696
Int. Cl. E02b *11/00*
U.S. Cl. 61—11                               3 Claims

ABSTRACT OF THE DISCLOSURE

A walk-on lawn comprises a compact, walk-on soil layer covered with turf and a drainage zone under the soil layer. The compact soil layer is formed with openings which communicate with the surface and extend through the compact soil layer and into the drainage zone. The openings are filled with a filler material having a large void volume. Heating means are installed in the ground and operable to supply heat to said openings.

---

This invention relates to an improvement in a walk-on lawn, particularly a sports lawn, with drainage, in which lawn the soil has been compacted so that it can be walked upon and has been provided with turf and is formed with openings which extend from the surface into the drainage zone and which are filled with filler material having a large void volume, to enable a direct drainage of water from the region near the surface.

To form such a lawn, the subsoil may be highly compacted and may then be provided with a thin layer of seeds and of a material which enables the seeds to germinate, such as peat, straw, sawmill waste or the like. This layer is preferably anchored by a suitable asphalt emulsion. The resulting lawn can be walked upon after having been mowed once. The water which would otherwise accumulate in the turf after copious rainfalls is discharged by the openings, which extend into the turf. As a result, the compacted subsoil is not softened so that the lawn can be walked upon without damage soon after the rain has ceased. The form of the openings which serve for the drainage of water may be selected in view of specific requirements. For sports lawns, continuous, slot-like openings in a width of 2–5 cm. will be used in most cases and will be spaced between 0.5 metre and 3 metres apart. Such slots may also form a grid of crossing longitudinal and transverse slots.

According to the invention, heating elemetns are disposed in the openings.

The heataing elements may be embedded in the filler material which is contained in the openings. Where slot-like openings are used, one or more heating wires of a low-voltage electric heating system may be provided in each slot.

In the case of a thaw after periods of frost, or during an ice rain or the like, the heaters enable the openings to be kept free of ice at least to such a degree that a sufficient drainage of water is ensured. Using a relatively small amount of thermal energy, it is now possible to effect a discharge of water formed by melting snow or ice, or of water from rain which has fallen on frozen subsoil, before it freezes on the sub-cooled subsoil. During a prolonged thaw, a large part of the water formed by melting snow or ice is discharged through the openings so that the subsoil will not be softened between the slots. Because the soil can thus be held relatively dry, frosts after thaws cannot substantially loosen the compact subsoil. As the water formed by melting ice or snow is continuously discharged, a lawn according to the invention will be free of snow and ice quickly during a thaw and can be walked upon without damage.

Heating means for sports grounds are known, which use either steam pipes or electrically heated wire mesh as heating elements. These known heating means serve to thaw the entire turf layer and to melt snow or ice away. Such systems have an extremely high power requirement. They require a direct heating of the entire area and can be used to advantage only when an excessive frost is not to be feared because otherwise the high temperature rise of the soil will cause the grass and the like to sprout so that it can be subsequently destroyed by the action of frost. In contrast thereto, the heating of the lawn according to the invention has virtually no effect on the vegetation.

The invention will now be explained more fully with reference to the drawing, which shows in a transverse sectional view a drainage slot provided in the ground.

The surface 1 of the ground is covered with turf 2. From this surface, preferably parallel, spaced apart slots 3 extend into a stratum which drains the water. In the embodiment shown by way of example, this stratum is defined by a drainpipe 4, which is connected at its ends to collecting pipes and is formed in its periphery with slots 5.

The width of the slots 3 is between 2 and 5 centimeters and will depend on the kind of grass and on the climatic conditions. It is important that the parts of the plants disposed over the ground, more particularly the grass stalks, cover the top ends of the slots 3 so that these cannot be seen. The slots 3 are filled with a filler material which has a large pore volume, e.g., with pumice or slag. Any water which falls on the surface 1 due to precipitation or thaw will thus be drained quickly through the slots 3 before it can soften the subsoil 7. The latter is so compact that it can be walked upon. The removal of water may be facilitated by heating conductors 8, which are disposed in the slots 3 and belong to a low-voltage electric heating system. The heating of the slots with the aid of these heating conductors ensures that the slot will be kept free of ice so that water from the surface can be discharged through the slots at any time, also during a thaw. The heating by the heating conductors 8 may be supplemented by a supply of steam through the pipes 4 so that these pipes serve both for drainage and heating. At least a major portion of the steam which is supplied to the pipes will escape through the slots 3, where it encounters the smallest resistance. The escaping steam removes ice from the slots 3 and prevents a formation of ice in the slots 3.

What is claimed is:
1. A walk-on lawn comprising:
   (1) a compact, walk-on layer of soil,

(a) the layer of soil defining a plurality of long and narrow slots;

(2) a turf covering the layer of soil and the slots being narrow enough to be overgrown by the grass of the turf;

(3) a drainage zone under the layer of soil, the slots extending through the layer of soil from the turf to the drainage zone;

(4) a filler material having a large pore volume filling the slots; and (5) a low-voltage electric heating system comprising a heating wire embedded in the filler material in each slot.

2. The walk-on lawn of claim 1, wherein the slots have a width between two and five centimeters.

3. The walk-on lawn of claim 2, further comprising drainage pipes disposed in the drainage zone and in communication with the slots.

References Cited

UNITED STATES PATENTS

| | | | |
|---|---|---|---|
| Re. 10,388 | 9/1893 | Henning | 61—10 X |
| 986,940 | 3/1911 | Osborne | 61—10 |
| 1,105,539 | 7/1914 | Smith | 61—10 X |
| 2,604,023 | 7/1952 | Messiah | 94—33 |
| 3,227,853 | 1/1966 | Gordon | 219—213 |
| 3,047,701 | 7/1962 | Frungel | 94—3 |

FOREIGN PATENTS 436,326  10/1935  Great Britain.

EARL J. WITMER, *Primary Examiner.*